(12) United States Patent
Kanakubo et al.

(10) Patent No.: US 9,590,414 B2
(45) Date of Patent: *Mar. 7, 2017

(54) CURRENT CONTROLLER AND PROTECTION CIRCUIT

(71) Applicant: PANASONIC INTELLECTUAL PROPERTY MANAGEMENT CO., LTD., Osaka (JP)

(72) Inventors: Yoshihide Kanakubo, Osaka (JP); Noboru Nakashima, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,811

(22) Filed: Nov. 30, 2015

(65) Prior Publication Data

US 2016/0087420 A1    Mar. 24, 2016

Related U.S. Application Data

(60) Division of application No. 13/280,944, filed on Oct. 25, 2011, now Pat. No. 9,246,323, which is a
(Continued)

(30) Foreign Application Priority Data

Apr. 27, 2009   (JP) .................................. 2009-107886

(51) Int. Cl.
*H02H 3/00*   (2006.01)
*H02H 3/08*   (2006.01)
(Continued)

(52) U.S. Cl.
CPC .................. *H02H 3/08* (2013.01); *G01K 7/22* (2013.01); *H02H 3/087* (2013.01); *H02H 5/04* (2013.01); *H02H 3/006* (2013.01); *H02H 5/042* (2013.01)

(58) Field of Classification Search
CPC ...................................................... H02H 3/08
(Continued)

(56) References Cited

U.S. PATENT DOCUMENTS 6,911,809 B2   6/2005  Kernahan
8,433,938 B2   4/2013  Cha et al.
(Continued)

FOREIGN PATENT DOCUMENTS

JP   09-145750 A   6/1997
JP   11-289656 A   10/1999
(Continued)

OTHER PUBLICATIONS

International Search Report issued in PCT/JP2010/001613, dated May 25, 2010.
(Continued)

*Primary Examiner* — Stephen W Jackson
(74) *Attorney, Agent, or Firm* — McDermott Will & Emery LLP

(57) ABSTRACT

A current controller for generating a control signal which controls supply current flowing from a power source to a load includes an interface circuit which sets a threshold based on an instruction from an outside of the current controller, a threshold setting circuit which stores and outputs the threshold, a sensing circuit which determines a current or a temperature of a sensing element, and outputs a signal indicating that the supply current should be interrupted as the control signal if a determined current or a determined temperature exceeds the threshold, and a sensing (Continued)

control circuit which generates a clock signal including pulses with a predetermined period. The sensing circuit determines the current or the temperature of the sensing element during an active period of the clock signal.

36 Claims, 4 Drawing Sheets

Related U.S. Application Data continuation of application No. PCT/JP2010/001613, filed on Mar. 8, 2010.

(51) Int. Cl.
*H02H 3/087* (2006.01)
*G01K 7/22* (2006.01)
*H02H 5/04* (2006.01)

(58) Field of Classification Search
USPC .......................................................... 361/59
See application file for complete search history.

(56) References Cited

U.S. PATENT DOCUMENTS

| 9,246,323 B2* | 1/2016 | Kanakubo .............. H02H 3/087 |
|---|---|---|
| 2004/0039745 A1 | 2/2004 | Evans et al. |
| 2004/0135591 A1 | 7/2004 | Tsutsui |
| 2004/0150928 A1 | 8/2004 | Goodfellow et al. |
| 2009/0082909 A1 | 3/2009 | Sakane |
| 2009/0257164 A1 | 10/2009 | Ikeuchi et al. |
| 2013/0227322 A1 | 8/2013 | Cha et al. |

FOREIGN PATENT DOCUMENTS

| JP | 11-319395 A | 11/1999 |
|---|---|---|
| JP | 2004-219126 A | 8/2004 |
| JP | 2009-081948 A | 4/2009 |
| WO | 2008/004445 A1 | 1/2008 |

OTHER PUBLICATIONS

Non-Final Office Action issued in related U.S. Appl. No. 13/280,944, mailed on Apr. 1, 2013.
Final Office Action issued in related U.S. Appl. No. 13/280,944, mailed on Jun. 25, 2014.
Non-Final Office Action issued in related U.S. Appl. No. 13/280,944, mailed on Oct. 8, 2014.
Final Office Action issued in related U.S. Appl. No. 13/280,944, mailed on Jun. 10, 2015.
Notice of Allowance issued in related U.S. Appl. No. 13/280,944, mailed on Aug. 31, 2015.
"LTC 4099 Datasheet: I2C Controlled USB Power Manager/Charger with Overvoltage Protection," Linear Technology Corporation. 2008; pp. 1-36.
"TPS65800 Datasheet: Single-Cell Li-Ion Battery—And Power—Management IC," Sep. 2005. Texas Instrument Incorporated, Dallas Texas, 2015; pp. 1-99.

* cited by examiner

CURRENT CONTROLLER AND PROTECTION CIRCUIT

This is a Divisional application of U.S. application Ser. No. 13/280,944, filed on Oct. 25, 2011, now U.S. Pat. No. 9,246,323, which is a continuation of PCT International Application PCT/JP2010/001613 filed on Mar. 8, 2010, which claims priority to Japanese Patent Application No. 2009-107886 filed on Apr. 27, 2009. The disclosures of these applications including the specifications, the drawings, and the claims are hereby incorporated by reference in its entirety.

BACKGROUND

The technology disclosed in this specification relates to current controllers which interrupt supply current to electronic devices for protecting the electronic devices.

Electronic devices, typically mobile phones, operate under electrical power supplied from power sources such as batteries or alternating current (AC) adapters. Such an electronic device often has a protection circuit to interrupt the supply of power from the power source when the protection circuit detects an abnormal value of current supplied from the power source or an abnormal temperature of the electronic device. Japanese Patent Publication No. H11-289656 (Patent Document 1) discloses an example of a protection circuit which determines an ambient temperature of a switch element in order to prevent failure of the switch element which passes or interrupts current. Japanese Patent Publication No. 2004-219126 (Patent Document 2) discloses a device which determines a current value using a resistor for current determination.

SUMMARY

Condition of an electronic device varies depending on a function performed by the electronic device, and therefore a threshold temperature or a threshold current for determining abnormality of a value also varies. However, the circuit of Patent Document 1 can only detect that a temperature has exceeded a predetermined threshold. A resistor used for current determination, such as one described in Patent Document 2, needs to have a known resistance value.

It is an object of the present invention to provide a current controller in which a threshold for determining that the supply current should be interrupted can be changed.

A current controller according to an example embodiment of the present invention is a current controller for generating a control signal which controls supply current flowing from a power source to a load including an interface circuit configured to set a threshold based on an instruction from an outside of the current controller, a threshold setting circuit configured to store and output the threshold, a sensing circuit configured to determine a current or a temperature of a sensing element, and to output a signal indicating that the supply current should be interrupted as the control signal if a determined current or a determined temperature exceeds the threshold, and a sensing control circuit configured to generate a clock signal including pulses with a predetermined period. The sensing circuit determines the current or the temperature of the sensing element during an active period of the clock signal.

According to this, since the threshold can be changed, the threshold can be set depending on a condition which is supposed to exist in the electronic device corresponding to an application executed by the electronic device. Thus, a determination of abnormality can be appropriately made, and accordingly an electronic device in which the supply current is controlled by the current controller can be more reliably protected.

A protection circuit according to an example embodiment of the present invention includes a sensing element, a current controller configured to generate a control signal, and a switch configured to control supply current from a power source based on the control signal. The current controller includes an interface circuit configured to set a threshold based on an instruction from an outside of the current controller, a threshold setting circuit configured to store and output the threshold, a sensing circuit configured to determine a current or a temperature of the sensing element, and to output a signal indicating that the supply current should be interrupted as the control signal if a determined current or a determined temperature exceeds the threshold, and a sensing control circuit configured to generate a clock signal including pulses with a predetermined period. The sensing circuit determines the current or the temperature of the sensing element during an active period of the clock signal.

The example embodiment of the present invention allows a determination that an electronic device is in an abnormal condition to be appropriately made, and thus an electronic device in which the supply current is controlled by a current controller can be more reliably protected.

DETAILED DESCRIPTION

Figure 1:
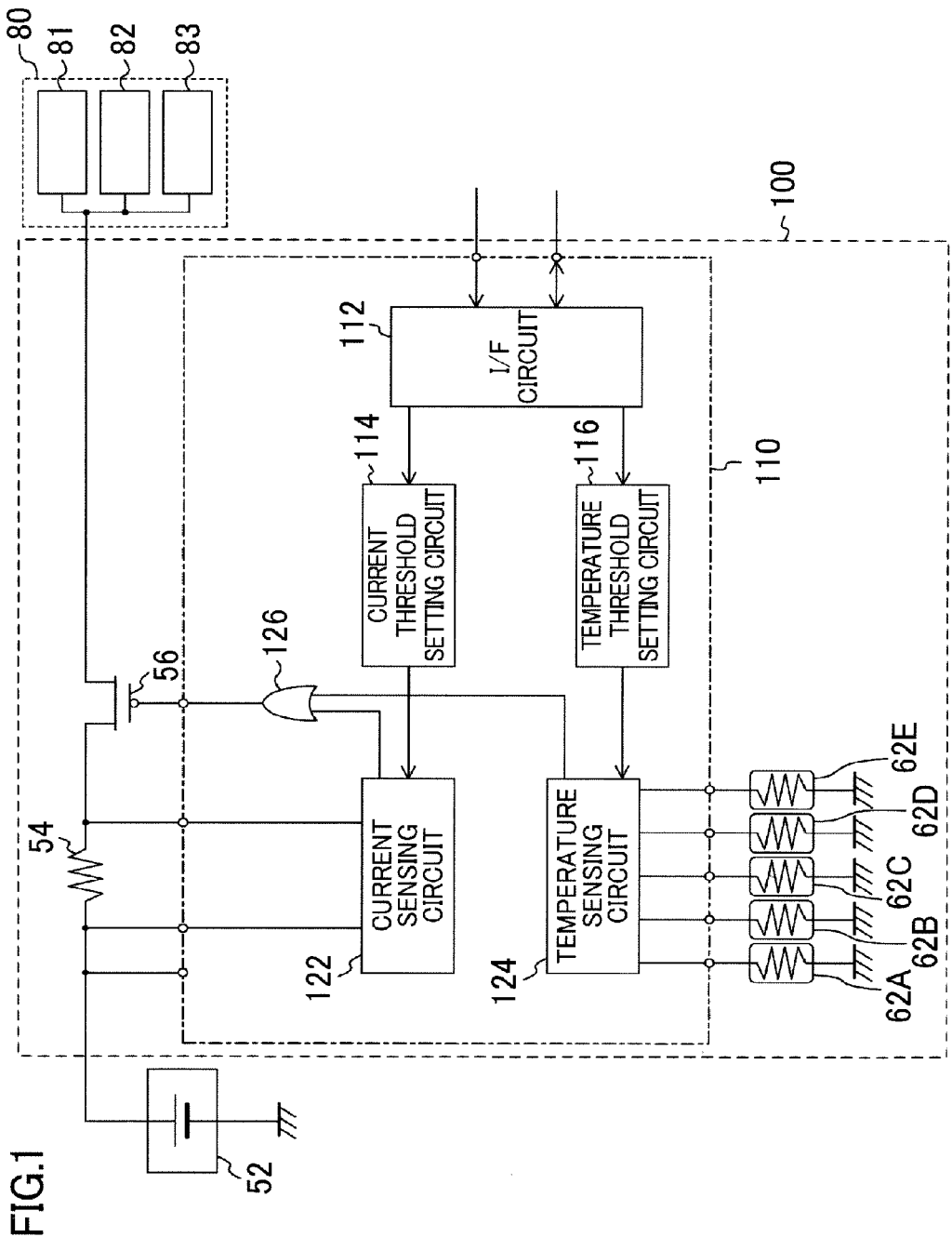
FIG. 1 is a block diagram illustrating an example configuration of a protection circuit according to the example embodiment of the present invention.

An example embodiment of the present invention will be described below with reference to the drawings, in which reference numerals having the same last two digits designate the same or similar components which correspond to one another.

FIG. 1 is a block diagram illustrating an example configuration of a protection circuit according to the example embodiment of the present invention. The protection circuit 100 of FIG. 1 controls supply current from a power source and outputs the result. The protection circuit 100 includes a resistor 54 as a sensing element, a switch 56, thermistors 62A, 62B, 62C, 62D, and 62E as sensing elements, and a current controller 110.

The current controller 110 generates a control signal which controls the supply current from the power source, and includes an interface circuit 112, a current threshold setting circuit 114, a temperature threshold setting circuit 116, a current sensing circuit (sensing circuit) 122, a temperature sensing circuit (sensing circuit) 124, and an OR gate 126. The current controller 110 is formed, for example, on a single semiconductor substrate.

The power source is, for example, a battery 52, and the switch 56 is, for example, a p-channel metal oxide semiconductor (PMOS) transistor. As shown in FIG. 1, current from the battery 52 is supplied through the resistor 54 and the switch 56 to application integrated circuits (ICs) 81, 82, and 83 included in an electronic device 80 to be protected. The thermistors 62A-62E are, for example, attached on the surfaces of the application ICs 81-83. It is assumed that the resistance value of the resistor 54 and the characteristics of the thermistors 62A-62E are known.

The interface circuit 112 sets, based on an instruction from the outside of the current controller 110, a current threshold in the current threshold setting circuit 114 and a temperature threshold in the temperature threshold setting circuit 116 as thresholds for determining that the supply current should be interrupted. The current threshold setting circuit 114 stores the current threshold, and outputs the stored current threshold to the current sensing circuit 122. The temperature threshold setting circuit 116 stores the temperature threshold, and outputs the stored temperature threshold to the temperature sensing circuit 124.

The current sensing circuit 122 measures the voltage across the two terminals of the resistor 54, thereby determines the current of the resistor 54, that is, discharge or charge current of the battery 52. The current sensing circuit 122 normally outputs a signal to the OR gate 126 as the control signal, indicating that the supply current from the battery 52 should be output (in the case of FIG. 1, a signal at a low logic level (L level)).

The temperature sensing circuit 124 sources predetermined current to each of the thermistors 62A-62E. The temperature sensing circuit 124 measures the voltage at the terminal of each of the thermistors 62A-62E, thereby determines the temperatures of the thermistors 62A-62E. The temperatures of the thermistors 62A-62E respectively represent ambient temperatures of the installation sites. The temperature sensing circuit 124 normally outputs a signal to the OR gate 126 as the control signal, indicating that the supply current from the battery 52 should be output (L level signal). Accordingly, in a normal condition, the OR gate 126 outputs "L" to the switch 56, and the switch 56 is in an ON state.

When the determined current exceeds the current threshold output from the current threshold setting circuit 114, the current sensing circuit 122 determines that the protection circuit 100 is in an abnormal condition in which an overcurrent flows, and outputs a signal indicating that the supply current from the battery 52 should be interrupted (in the case of FIG. 1, a signal at a high logic level (H level)) to the OR gate 126 as the control signal. Then, the output of the OR gate 126 goes "H," and the switch 56 is turned off, thereby causing the supply current to the application ICs 81-83 to be interrupted.

When at least one of the determined temperatures exceeds the temperature threshold output from the temperature threshold setting circuit 116, the temperature sensing circuit 124 determines that the protection circuit 100 is in an abnormal condition in which the temperature around the thermistor indicating the temperature is too high, and outputs a signal indicating that the supply current from the battery 52 should be interrupted (H level signal) to the OR gate 126 as the control signal. Then, the output of the OR gate 126 goes "H," and the switch 56 is turned off, thereby causing the supply current to the application ICs 81-83 to be interrupted.

As described above, since the current controller 110 includes the interface circuit 112, the current threshold set in the current threshold setting circuit 114 and the temperature threshold set in the temperature threshold setting circuit 116 can be changed from the outside of the current controller 110. That is, the current threshold and the temperature threshold can be set depending on the conditions which are supposed to exist in the application ICs 81-83 corresponding to applications executed by the application ICs 81-83. Thus, a determination that at least one of the application ICs 81-83 is in an abnormal condition can be appropriately made, and the current controller 110 can suitably control the supply current, thereby allowing the electronic device 80 to be reliably protected.

Figure 2:
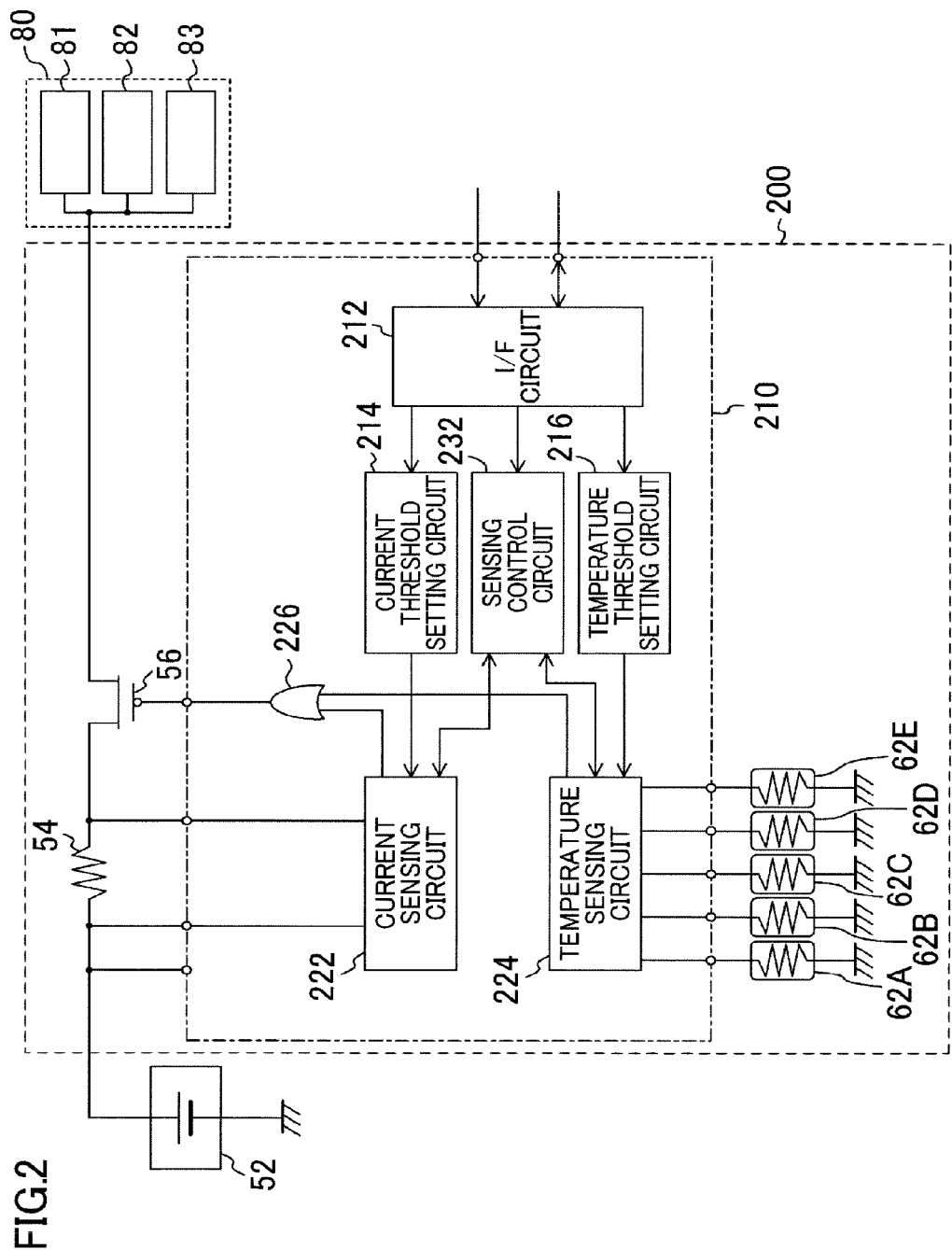
FIG. 2 is a block diagram illustrating a first variation of the protection circuit shown in FIG. 1.

FIG. 2 is a block diagram illustrating a first variation of the protection circuit 100 of FIG. 1. The protection circuit 200 of FIG. 2 differs from the protection circuit 100 in including a current controller 210 in place of the current controller 110. The current controller 210 includes an interface circuit 212, a current threshold setting circuit 214, a temperature threshold setting circuit 216, a current sensing circuit 222, a temperature sensing circuit 224, an OR gate 226, and a sensing control circuit 232.

The sensing control circuit 232 includes a clock generator which generates, for example, a clock signal including pulses each having a width of 10 μs at a period of 1 ms. The sensing control circuit 232 divides the frequency of the generated clock signal, and outputs the frequency-divided clock signal to both the current sensing circuit 222 and the temperature sensing circuit 224. In the case of FIG. 2, since there are six sensing elements provided (the resistor 54 and thermistors 62A-62E), the sensing control circuit 232 outputs one pulse to the current sensing circuit 222, and five pulses to the temperature sensing circuit 224 every six pulses of the clock signal.

During one pulse period, the current sensing circuit 222 measures the voltage across the terminals of the resistor 54, thereby determines the current of the resistor 54. During the five pulse periods, the temperature sensing circuit 224 sources predetermined current to the thermistors 62A-62E one by one, and measures the voltage at the terminal of each of the thermistors 62A-62E through which the current flows, thereby determines the temperatures of the thermistors 62A-62E. Since the current flows through each of the thermistors 62A-62E only during the measurement period of 10 μs every 6 ms, the current sensing circuit 222 and the temperature sensing circuit 224 only need to measure the voltage of each sensing element once every 6 ms, thereby causing the current consumption to be significantly reduced as compared to a case of continuous measurement.

The interface circuit 212 sets a clock period in the sensing control circuit 232 based on an instruction from the outside of the current controller 210. The sensing control circuit 232 generates the clock signal including pulses at the set clock period. Thus, the measurement interval of each sensing element can be set depending on the electronic device 80 to be protected, or on the condition of the electronic device 80. For example, setting a shorter period allows a measurement of each sensing element to be performed in a shorter period, thereby allowing an abnormal condition to be detected earlier.

When an application is used which imposes a large burden on the electronic device 80, the electronic device 80 heats up to a high temperature, and a high current flows in the electronic device 80. Accordingly, an early detection of the abnormal condition is required. Also, in this case, since the electronic device 80 itself consumes a high current, reducing the measurement interval and increasing the current consumption causes only a small rate of increase in the current consumption including that of the electronic device 80. Meanwhile, when an application is used which imposes only a small burden on the electronic device 80, it is unlikely that the electronic device 80 heats up to a high temperature, and that a high current flows in the electronic device 80. Accordingly, a longer measurement interval is required to reduce the current consumption, and thus to achieve a reliable monitoring for an abnormal condition. In this way, appropriately changing the clock period allows optimization of the monitoring of an abnormal temperature and an abnormal current.

Figure 3:
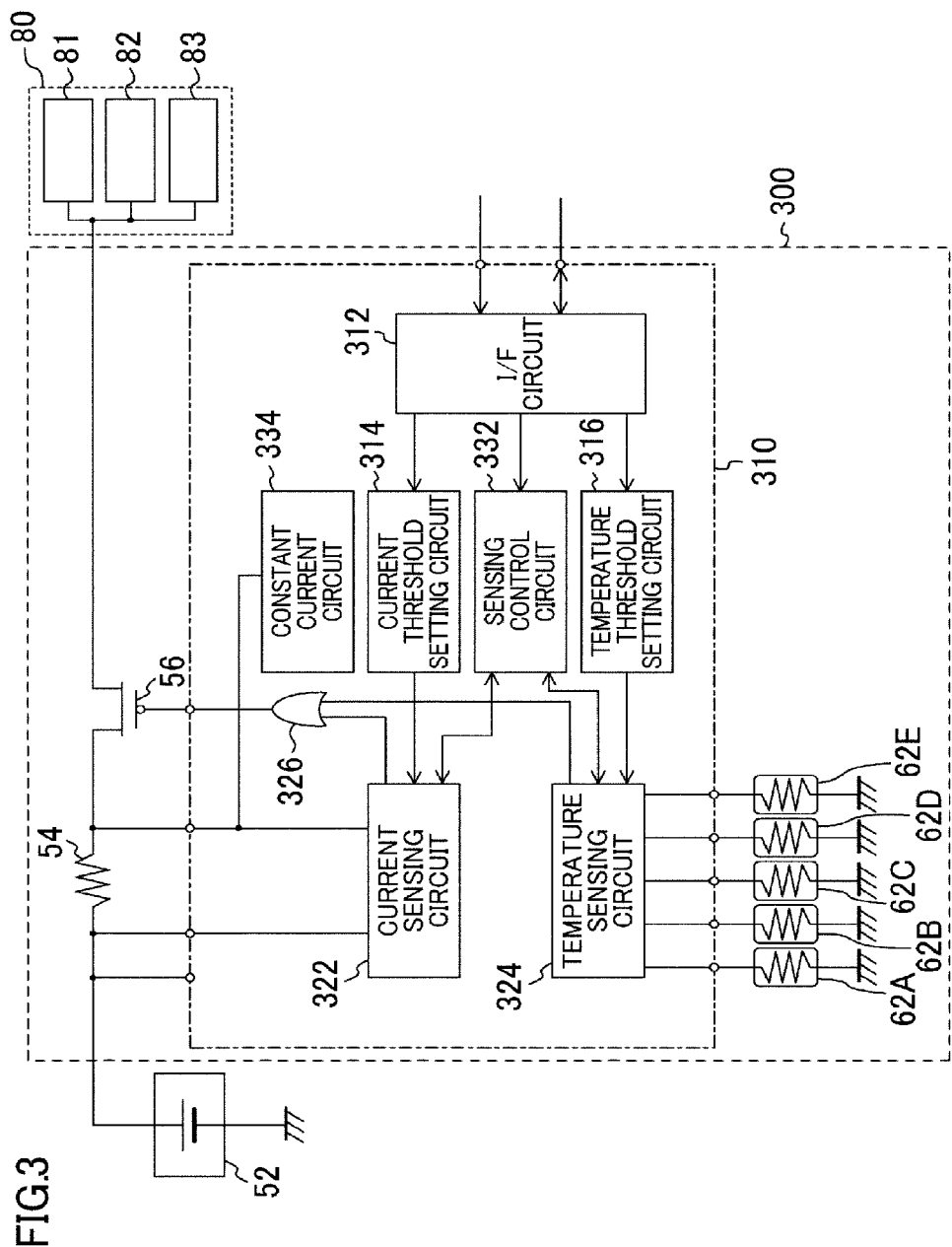
FIG. 3 is a block diagram illustrating a second variation of the protection circuit shown in FIG. 1.

FIG. 3 is a block diagram illustrating a second variation of the protection circuit 100 of FIG. 1. The protection circuit 300 of FIG. 3 differs from the protection circuit 100 in including a current controller 310 in place of the current controller 110. The current controller 310 includes an interface circuit 312, a current threshold setting circuit 314, a temperature threshold setting circuit 316, a current sensing circuit 322, a temperature sensing circuit 324, an OR gate 326, a sensing control circuit 332, and a constant current circuit 334. The current controller 310 has a function to determine the resistance value of the external resistor 54.

The constant current circuit 334 includes a constant current circuit which sources or sinks a constant current Ic (e.g., 100 mA). The protection circuit 300 of FIG. 3 places the switch 56 in an OFF state to wait for the circuit to stabilize during its start-up operation. At this time, the constant current circuit 334 sources or sinks the constant current Ic. This causes a current to flow from the battery 52 through the resistor 54 to the constant current circuit 334, thereby causing a voltage drop Vd across the resistor 54.

The current sensing circuit 322 measures the voltage across the two terminals of the resistor 54, thereby obtains the resistance value R=Vd/Ic of the resistor 54 from the voltage drop Vd across the resistor 54 and from the constant current Ic supplied by the constant current circuit 334. Thereafter, the constant current circuit 334 interrupts the current, and the current sensing circuit 322 and the temperature sensing circuit 324 each output a signal indicating that the supply current from the battery 52 should be output (L level signal) to the OR gate 326 as the control signal, thereby turns on the switch 56. The subsequent operation is performed in a similar way to that of the protection circuit 200 of FIG. 2, using the resistance value R.

According to the current controller 310 of FIG. 3, the measurement of the resistance value of the resistor 54 allows resistors having various resistance values to be used as the external resistor 54 depending on the electronic device 80. Moreover, since the value of current flowing through the resistor 54 can be correctly determined, the electronic device 80 can be more reliably protected.

Figure 4:
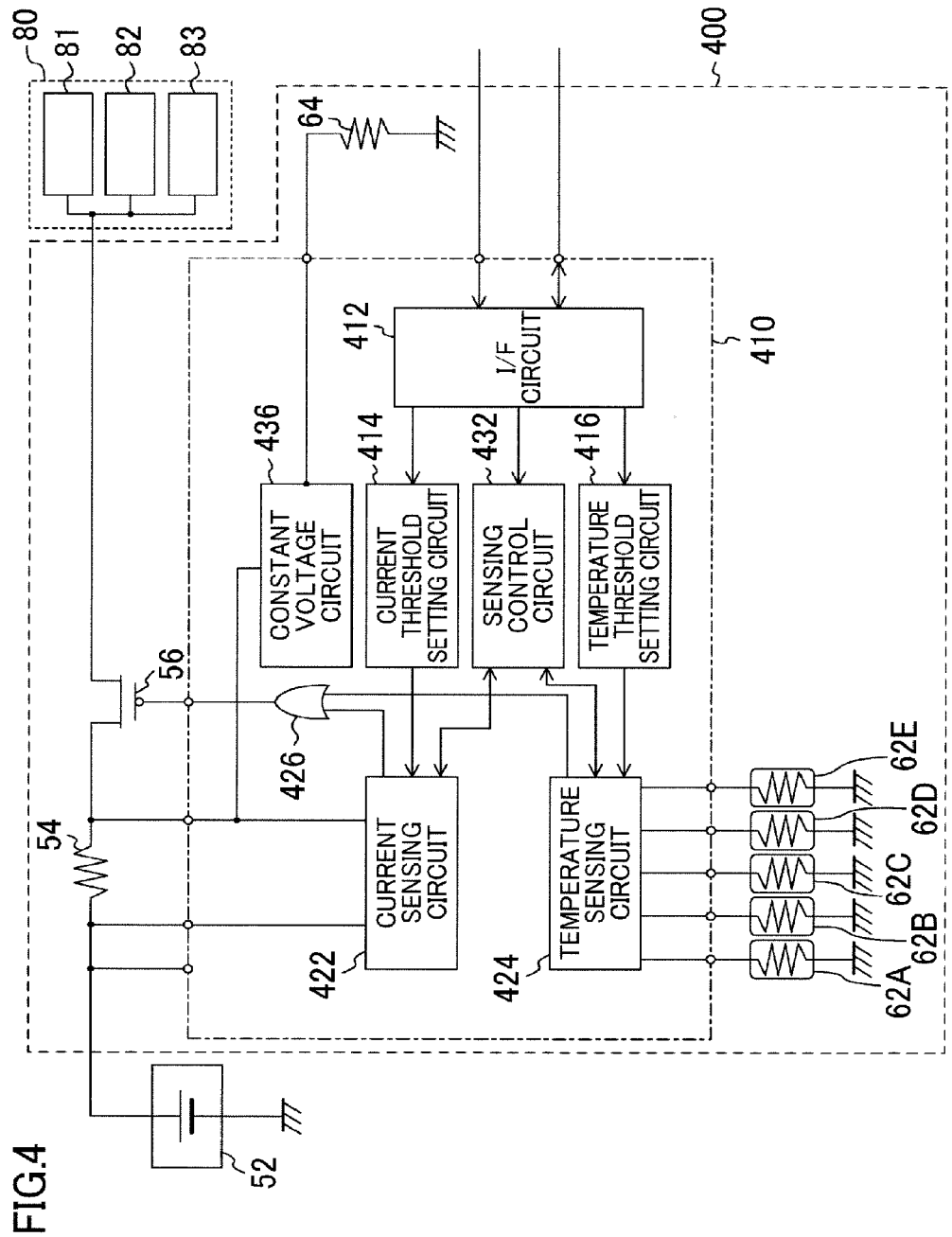
FIG. 4 is a block diagram illustrating a variation of the protection circuit shown in FIG. 3.

FIG. 4 is a block diagram illustrating a variation of the protection circuit 300 of FIG. 3. The protection circuit 400 of FIG. 4 differs from the protection circuit 300 in including a current controller 410 in place of the current controller 310, and in further including a resistor 64. The current controller 410 includes an interface circuit 412, a current threshold setting circuit 414, a temperature threshold setting circuit 416, a current sensing circuit 422, a temperature sensing circuit 424, an OR gate 426, a sensing control circuit 432, and a constant voltage circuit 436. The resistor 64 is, for example, a high accuracy resistor, and the correct resistance value thereof is known.

The constant voltage circuit 436 is one example of the constant current circuit 334 of FIG. 3, and is used in place of the constant current circuit 334. The constant voltage circuit 436 outputs, to the resistor 64, the constant current Ic, which flows into the constant voltage circuit 436 itself when measuring the resistance value of the resistor 54. The other features are similar to those of the constant current circuit 334 of FIG. 3.

In FIG. 4, the constant voltage circuit 436 is coupled to the external resistor 64. The constant voltage circuit 436 applies a constant voltage Vc (e.g., 1 V) to the resistor 64. Assuming that the resistance value R64 of the resistor 64 is 10Ω, the current which flows through the resistor 64 is I64=Vc/R64=100 mA. The constant voltage circuit 436 supplies, to the resistor 64, the constant current Ic, which flows into the constant voltage circuit 436 itself when measuring the resistance value of the resistor 54, as the current I64. Thus, the constant voltage circuit 436 can generate the constant current Ic (=100 mA).

As described above, according to the current controller 410, even if a high accuracy constant current cannot be generated therein, the constant voltage circuit 436 and the resistor 64 allow a high accuracy constant current to be generated. Therefore, as described above referring to FIG. 3, the resistance value of the external resistor 54 can be determined.

Note that, in the above embodiment, the switch 56 may be included within the current controller 110, 210, 310, or 410, and both the switch 56 and the current controller 110, 210, 310, or 410 may be formed on a single semiconductor substrate.

Although the above embodiment has been described as using thermistors as the elements for determining temperatures, any other element may be used as long as that element changes its characteristic depending on temperature. For example, a transistor may be used in place of a thermistor.

The foregoing description has been presented in terms of the operations for interrupting the supply of power when an abnormal condition is detected with respect to the protection circuits 100, 200, 300, and 400 of the above embodiment. Note that even if the interruption of the operation of the protected electronic device 80 causes, for example, the temperature to decrease, and the abnormal condition to be removed, the protection circuits are required to continue interrupting the current. Accordingly, the current controllers 110, 210, 310, and 410 of the above embodiment may each have a latch circuit, which is supplied with power directly from the battery 52, for maintaining a current interruption condition (i.e., for holding the control signal for the switch 56).

In the above embodiment, the interface circuits 112, 212, 312, and 412 may each receive a signal of inter-integrated circuit (IIC) interface or system packet interface (SPI), or may each receive a signal simply at an "H" or an "L" level.

As described above, the embodiment of the present invention allows electronic devices to be protected, and accordingly the present invention is useful for current controllers, protection circuits, etc.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A current controller for generating a control signal which controls supply current flowing from a power source to a load, comprising:
   a switch which controls the supply current from the power source;
   an interface circuit which sets a current threshold and a temperature threshold based on an instruction from an outside of the current controller;

a current threshold setting circuit which stores and outputs the current threshold;
a temperature threshold setting circuit which stores and outputs the temperature threshold;
a current sensing circuit which determines a current of a current sensing element, and outputs a current control signal indicating that the supply current should be controlled so as to prevent an over current flowing if a determined current exceeds the current threshold;
a temperature sensing circuit which determines a temperature of a temperature sensing element, and outputs a temperature control signal indicating that the supply current should be controlled so as to avoid overheating if a determined temperature exceeds the temperature threshold; and
a latching circuit which maintains a control condition when at least one of the current control signal and the temperature control signal is output.

2. The current controller of claim 1, further comprising: a clock generating circuit which generates a clock signal.

3. The current controller of claim 2, wherein the interface circuit sets an information to determine a period of the clock signal based on the instruction from the outside of the current controller.

4. The current controller of claim 2, wherein the interface circuit complies with IIC interface.

5. The current controller of claim 1, wherein the current sensing circuit has a function to output a current control signal indicating that the supply current should be interrupted.

6. The current controller of claim 1, wherein the temperature sensing circuit has a function to output a temperature control signal indicating that the supply current should be interrupted.

7. The current controller of claim 1, wherein the current controller is formed on a single semiconductor substrate.

8. The current controller of claim 7, further comprising: a plurality of terminals including a plurality of thermistor terminals, wherein external thermistors are connected to the plurality of thermistor terminals.

9. The current controller of claim 8, wherein
the plurality of terminals further include an output terminal for outputting the supply current to an external thermistor, and
the switch is located between the power source and the output terminal.

10. The current controller of claim 9, wherein the switch is a MOS transistor and the current control signal output from the current sensing circuit is input to a gate of the switch.

11. The current controller of claim 9, wherein the switch is a MOS transistor and the temperature control signal output from the temperature sensing circuit is input to a gate of the switch.

12. The current controller of claim 2, wherein a period of the clock signal decreases when the supply current increases.

13. The current controller of claim 1, wherein:
the switch is turned off when the latching circuit maintains the control condition.

14. A current controller for generating a control signal which controls supply current flowing from a power source to a load, comprising:
a current threshold setting circuit which stores and outputs a current threshold;
a temperature threshold setting circuit which stores and outputs a temperature threshold;
a clock generating circuit which generates a clock signal;
a current sensing circuit which determines a current of a current sensing element, and outputs a current control signal indicating that the supply current should be controlled so as to prevent an over current flowing if a determined current exceeds the current threshold; and
a temperature sensing circuit which determines a temperature of a temperature sensing element, and outputs a temperature control signal indicating that the supply current should be controlled so as to avoid overheating if a determined temperature exceeds the temperature threshold,
wherein a period of the clock signal decreases when the supply current increases.

15. The current controller of claim 14, further comprising:
an interface circuit which sets at least one of the current threshold and the temperature threshold based on an instruction from an outside of the current controller.

16. A device, comprising:
an interface circuit which sets a temperature threshold based on an instruction from an outside of the device;
a threshold setting circuit which stores and outputs the temperature threshold;
a sensing control circuit which stores and outputs a period of a periodical signal;
a periodical signal generating circuit which generates the periodical signal based on the period of the periodical signal; and
a sensing circuit which determines a temperature of a temperature sensing element during the period of the periodical signal, and outputs a control signal if a determined temperature exceeds the temperature threshold, wherein
the sensing circuit performs the determination on the temperature sensing element every the periods of the periodical signal.

17. The device of claim 16, wherein the interface circuit which sets the period of the periodical signal based on an instruction from an outside of the device.

18. The device of claim 16, wherein:
the period of the periodical signal includes a measurement period which is shorter than the period of the periodical signal and
the sensing circuit performs the determination on the temperature sensing element only during the measurement period.

19. The current controller of claim 1, wherein the control condition determines whether to generate an interruption signal or not.

20. A current controller for generating a control signal which controls supply current flowing between a power source and a load, comprising:
an interface circuit which sets a current threshold and a temperature threshold based on an instruction from an outside of the current controller;
a current threshold setting circuit which stores and outputs the current threshold;
a temperature threshold setting circuit which stores and outputs the temperature threshold;
a clock generating circuit which generates a clock signal;
a current sensing circuit which determines a current of a current sensing element, and outputs a current control signal indicating that the supply current should be controlled so as to prevent an over current flowing if a determined current exceeds the current threshold; and
a temperature sensing circuit which determines a temperature of a temperature sensing element, and outputs a temperature control signal indicating that the supply current should be controlled so as to avoid overheating if a determined temperature exceeds the temperature threshold, wherein the supply current flowing during a first period of the clock signal is higher than during a second period of the clock signal, and the first period is shorter than the second period.

21. The current controller of claim 20, further comprising:
a latching circuit which maintains a control condition when at least one of the current control signal and the temperature control signal is output.

22. The current controller of claim 20, wherein the interface circuit complies with IIC interface.

23. The current controller of claim 20, wherein the current sensing circuit outputs a current control signal indicating that the supply current should be interrupted.

24. The current controller of claim 20, wherein the temperature sensing circuit outputs a temperature control signal indicating that the supply current should be interrupted.

25. The current controller of claim 20, further comprising:
a switch which controls the supply current between the power source and the load.

26. The current controller of claim 20, wherein the current controller is formed on a single substrate.

27. The current controller of claim 20, further comprising:
a plurality of terminals including a plurality of thermistor terminals, wherein external thermistors are connected to the plurality of thermistor terminals.

28. The current controller of claim 27, wherein
the plurality of terminals further include an output terminal for outputting the supply current to an external thermistor, and
the switch is located between the power source and the output terminal.

29. The current controller of claim 25, wherein the switch is a MOS transistor and the current control signal output from the current sensing circuit is input to a gate of the switch.

30. The current controller of claim 25, wherein the switch is a MOS transistor and the temperature control signal output from the temperature sensing circuit is input to a gate of the switch.

31. A current controller for generating a control signal which controls supply current flowing between a power source and a load, comprising:
an interface circuit which sets a current threshold and a temperature threshold based on an instruction from an outside of the current controller;
a current threshold setting circuit which stores and outputs the current threshold;
a temperature threshold setting circuit which stores and outputs the temperature threshold;
a clock generating circuit which generates a clock signal;
a current sensing circuit which determines a current of a current sensing element, and outputs a current control signal indicating that the supply current should be controlled so as to prevent an over current flowing if a determined current exceeds the current threshold; and
a temperature sensing circuit which determines a temperature of a temperature sensing element, and outputs a temperature control signal indicating that the supply current should be controlled so as to avoid overheating if a determined temperature exceeds the temperature threshold,
wherein the interface circuit sets an information to determine the period of the clock signal based on the instruction from the outside of the current controller.

32. The current controller of claim 31, wherein the interface circuit complies with IIC interface.

33. The current controller of claim 31, wherein the current sensing circuit has a function to output a current control signal indicating that the supply current should be interrupted.

34. The current controller of claim 31, wherein the temperature sensing circuit outputs a temperature control signal indicating that the supply current should be interrupted.

35. The current controller of claim 31, further comprising:
a switch which controls the supply current between the power source and the load.

36. The current controller of claim 31, wherein the current controller is formed on a single substrate.

* * * * *